United States Patent
Makino

(10) Patent No.: US 7,646,194 B2
(45) Date of Patent: Jan. 12, 2010

(54) RESOLVER, MOTOR AND POWER STEERING APPARATUS

(75) Inventor: Yusuke Makino, Kyoto (JP)

(73) Assignee: Nidec Corporation, Kyoto (JP)

(*) Notice: Subject to any disclaimer, the term of this patent is extended or adjusted under 35 U.S.C. 154(b) by 263 days.

(21) Appl. No.: 11/861,514

(22) Filed: Sep. 26, 2007

(65) Prior Publication Data
US 2008/0079327 A1 Apr. 3, 2008

(30) Foreign Application Priority Data
Sep. 29, 2006 (JP) .............................. 2006-266308

(51) Int. Cl.
*G01B 7/30* (2006.01)
*G01D 5/245* (2006.01)
*H02K 24/00* (2006.01)

(52) U.S. Cl. .................................. 324/207.25; 310/168

(58) Field of Classification Search ............... 310/68 B, 310/168; 324/207.25
See application file for complete search history.

(56) References Cited
U.S. PATENT DOCUMENTS

| | | | |
|---|---|---|---|
| 5,446,966 A | * | 9/1995 | Ishizaki ...................... 33/1 PT |
| 5,763,976 A | * | 6/1998 | Huard ......................... 310/168 |
| 7,030,532 B2 | * | 4/2006 | Kobayashi et al. ........... 310/168 |
| 7,148,599 B2 | * | 12/2006 | Aoyama et al. .............. 310/168 |
| 2005/0023921 A1 | * | 2/2005 | Kobayashi et al. ........... 310/168 |

FOREIGN PATENT DOCUMENTS

| | | | |
|---|---|---|---|
| JP | 5-148579 | * | 12/1994 |
| JP | 9-65630 | * | 3/1997 |
| JP | 2698013 B2 | | 1/1998 |
| JP | 3200405 B2 | | 8/2001 |
| JP | 2005-049183 A | | 2/2005 |

* cited by examiner

*Primary Examiner*—Burton Mullins
(74) *Attorney, Agent, or Firm*—Keating & Bennett, LLP

(57) ABSTRACT

A resolver of a variable reluctance type includes a resolver stator portion of a substantially annular shape centered about a central axis, and a resolver rotor portion which is attached to a shaft of a motor rotor portion arranged inwardly of the resolver stator portion. The resolver is operable to increase accuracy for detecting a rotational angle when a size of gap g between a rotor core and a resolver stator portion at a predetermined point at an outer circumferential edge of the rotor core is set by using a maximum value for the gap g ($g_{max}$), a minimum value for the gap g ($g_{min}$), angle θ defined by a predetermined point and a reference point, axial double angle n, and the coefficient.

9 Claims, 5 Drawing Sheets

RESOLVER, MOTOR AND POWER STEERING APPARATUS

BACKGROUND OF THE INVENTION

1. Field of the Invention

The present invention relates to a variable reluctance type resolver, and an electrically powered motor having such a resolver and a power steering apparatus.

2. Description of the Related Art

Conventionally, a hydraulic power steering apparatus is used as a means to assist steering of an automobile or the like in which a pump generates, by an engine output, a hydraulic pressure so as to assist steering. Also, an electrically powered steering apparatus (hereinafter, referred to as an "EPS") is used as a means to assist steering of an automobile or the like in which a motor inside a car battery of the automobile rotates the motor. The EPS uses no engine output and is, compared with the hydraulic power steering apparatus, a more efficient system.

The EPS requires an angle detection apparatus which is operable to detect with high accuracy a rotational angle of the motor in order to achieve a high accuracy control of the system. Automobiles are required to operate accurately and for a long period of time in various types of environments. Therefore, the EPS which is a component in an automobile is required to be reliable in the aforementioned various environments.

The resolver of the variable reluctance type which achieves high accuracy and which is, compared with an optical encoder or a magnetic encoder, high in environmental resistance is used as the angle detection apparatus for the EPS. In such resolver, however, harmonic components in the induced voltage generated in the output coil may have an effect on the accuracy of the detection, and a configuration of the rotor of the resolver may have an effect on the harmonic components. Therefore, there are various technologies available for determining the configuration of the rotor in order to increase the accuracy of the detection of the resolver.

For example, Japanese Laid Open Patent Publication No. 2698013 discloses a technology for reducing detection error caused by harmonic components included in induction voltage of an output coil. Also, Japanese Laid Open Patent Publication 3200405 discloses a technology for reducing detection error caused by magnetic flux leaked from a rotor. Also, Japanese Laid Open Patent Publication No. 2005-49183 discloses a technology for approximating a gap permeance between a rotor and a stator to a sine wave pattern.

SUMMARY OF THE INVENTION

A resolver according to a preferred embodiment of the present invention is a variable reluctance type resolver. The resolver includes a stator portion having a substantially annular shape centered about a predetermined central axis having an excitation coil and an output coil, and a rotor portion arranged radially inward of the stator portion via a gap g therebetween. The rotor portion includes a core which is rotatably supported with respect to the stator portion. The gap g between the stator portion and the rotor portion can be calculated by a following equation:

$$g = \cfrac{1}{\cfrac{1}{2}\left(\cfrac{1}{g_{min}} + \cfrac{1}{g_{max}}\right) + \cfrac{1}{2}\left(\cfrac{1}{g_{min}} - \cfrac{1}{g_{max}}\right) \cdot \cos(n\theta)} + K(1 - \cos(2n\theta))$$

wherein $g_{max}$ is a minimum value for the gap g, $g_{min}$ is a maximum value for the gap g, angle $\theta$ is defined between a point of reference and a predetermined point set at an outer circumferential end of the core, n is an axial double angle (a positive integer), and K is a coefficient.

Other features, elements, steps, characteristics and advantages of the present invention will become more apparent from the following detailed description of the preferred embodiments thereof with reference to the attached drawings.

DETAILED DESCRIPTION OF THE PREFERRED EMBODIMENTS

Power Steering

Figure 1:
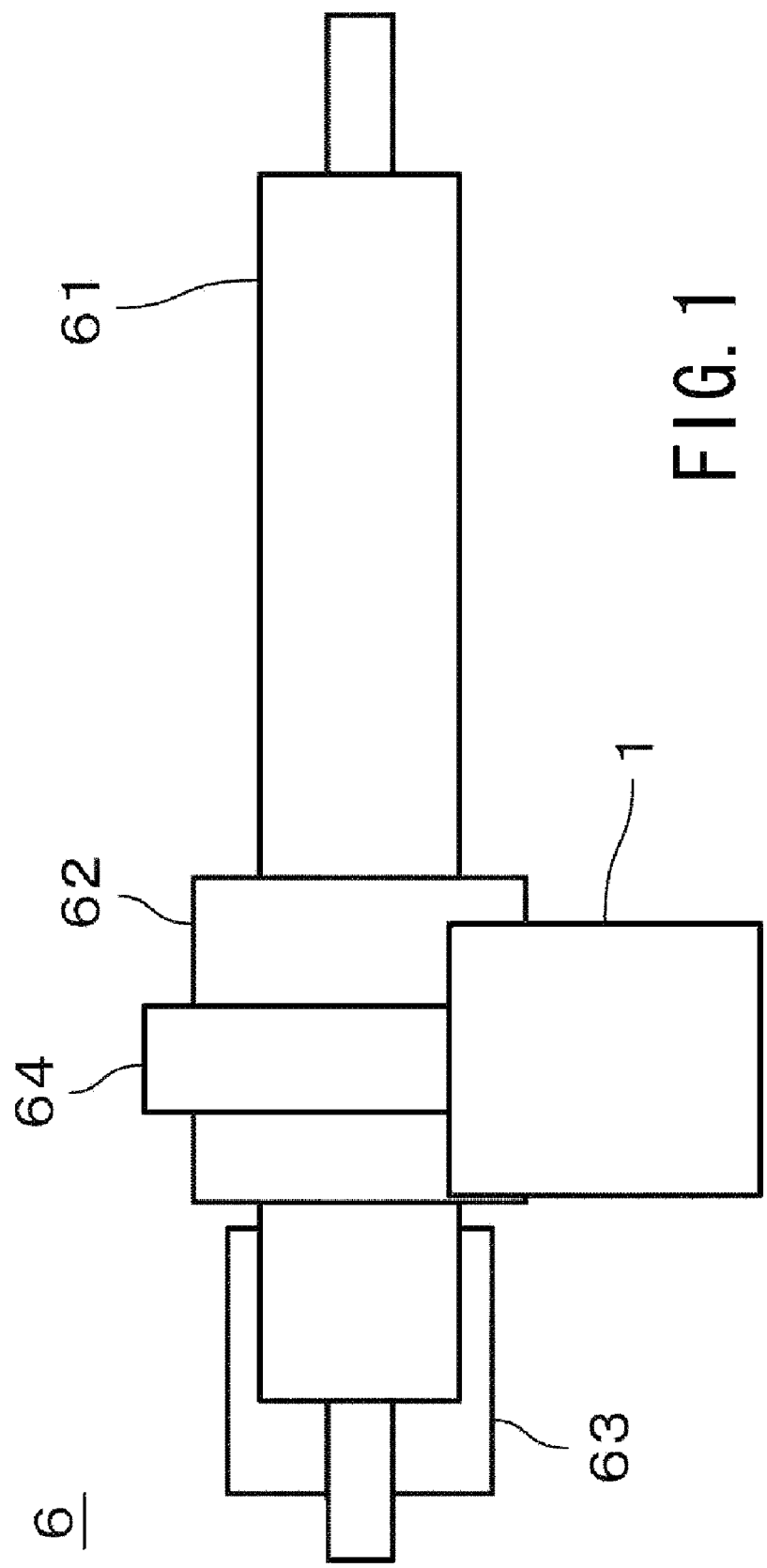
FIG. 1 is a schematic view of a power steering apparatus according to a preferred embodiment of the present invention.

Note that in the description of preferred embodiments of the present invention herein, words such as upper, lower, left, right, upward, downward, top and bottom for describing positional relationships between respective members and directions merely indicate positional relationships and directions in the drawings. Such words do not indicate positional relationships and directions of the members mounted in an actual device. Also, note that reference numerals, figure numbers and supplementary descriptions are shown below for assisting the reader in finding corresponding components in the description of the preferred embodiments below to facilitate the understanding of the present invention. It should be understood that these expressions in no way restrict the scope of the present invention.

FIG. 1 is a schematic view of an electrically powered power steering apparatus 6 having a resolver of a variable reluctance type according to a preferred embodiment of the present invention. The power steering apparatus 6 is used for assisting in steering an automobile or the like.

As shown in FIG. 1, the power steering apparatus 6 preferably includes a shaft portion 61 connected to a steering mechanism such as a steering wheel, an axle or the like, a torque sensor 62 detecting a rotary force (torque) applied to the steering, a control unit 63 calculating based on the detection of the torque sensor 62 a force necessary to assist the steering, a motor 1 generating based on the calculation of the control unit 63 a rotary force, and a deceleration unit 64 decelerating the motor 1 and communicating the rotary force to the steering mechanism.

In a vehicle having the power steering apparatus 6, the motor 1 of the power steering apparatus 6 is activated in conformity to the rotary force applied by an operator to the steering wheel. The power steering apparatus 6 assists the steering wheel based on the rotary force generated by the motor 1. Therefore, the power steering apparatus 6 assists the steering without using an engine output.

Motor

Figure 2:
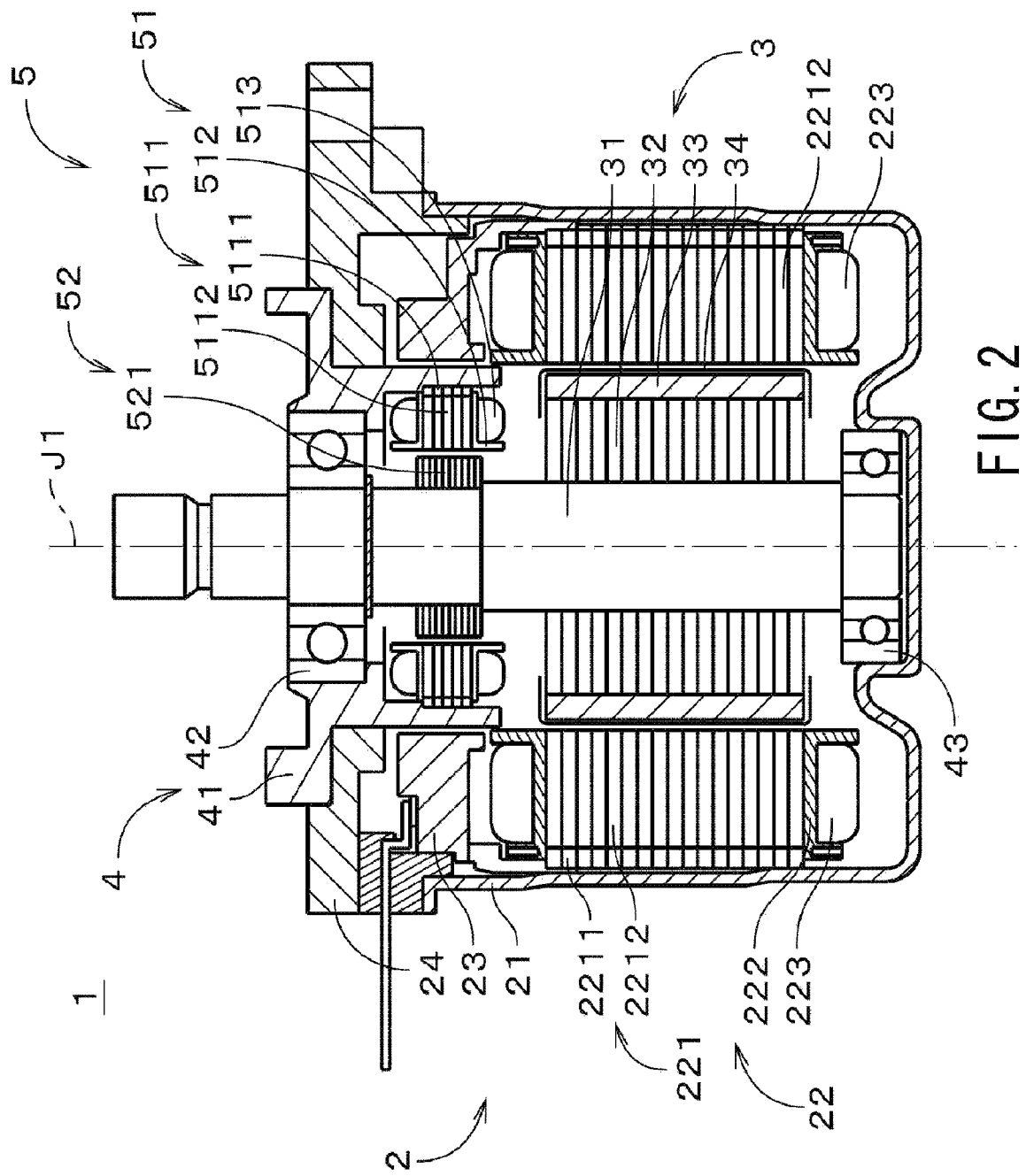
FIG. 2 is a schematic cross sectional view of a motor according to a preferred embodiment of the present invention.

FIG. 2 is a schematic cross sectional view of the motor 1 according to the present preferred embodiment of the present invention. As shown in FIG. 2, the motor 1 which is an inner rotor type motor preferably including a motor stator portion 2 which is a fixed assembly, a motor rotor portion 3 which is a rotatable assembly, a bearing mechanism 4 which rotatably supports the motor rotor portion 3 with respect to the motor stator portion 2 in a concentric manner with a central axis J1, and a resolver 5 of the variable reluctance type which is an angle detection apparatus detecting an angle defined by the motor rotor portion 3 with respect to the motor stator portion 2.

The motor stator portion 2 preferably includes a cylindrical portion concentric with the central axis J1, a housing 21 having a bottom portion which covers a lower side of the cylindrical portion, an armature 22 arranged at an inner circumferential surface of the cylindrical portion, a busbar 23 which is attached to the housing 21 above the armature 22 and connects the armature 22 to an outside electrode, and a bracket 24 having a substantially annular shape arranged above the busbar 23.

The armature 22 preferably includes a stator core 221 formed by laminating a plurality of thin silicon steel plates. The stator core 221 preferably includes a core back 2211 of annular shape, and a plurality (for example, 12 in the present preferred embodiment) of teeth 2212 each extending from the core back 2211 toward the central axis J1. The armature 22 preferably includes an insulator 222 formed by coating a surface of the stator core 221, and a plurality of coils 223 each formed by winding a conductive wire around each tooth 2212 via the insulator 222.

The motor rotor portion 3 preferably includes a shaft 31 centered about the central axis J1, a yoke 32 of a substantially cylindrical shape affixed about the shaft 31, a field magnet 33 affixed preferably via an adhesive at an outer circumferential surface of the yoke 32, and a cover member 34 covering an outer side of the field magnet 33 made of a nonmagnetic material so as to secure the field magnet 33. The yoke 32 is formed by laminating a plurality of thin magnetic steel plates. The field magnet 33 is arranged on a side of the central axis J1 of the armature 22. A rotary force (torque) will be generated so as to be centered about the central axis J1 between the armature 22 and the field magnet 33.

The bearing mechanism 4 preferably includes a bearing holder 41 of a substantially cylindrical shape formed at a substantially center of the bracket 24, an upper bearing holder 42 arranged at an inner circumferential surface of the bearing holder 41, and a lower bearing holder 43 arranged at a substantially center of a bottom of the housing 21. The shaft 31 protruding upwardly of the bearing holder 41 and the bracket 24 via a central open portion of the bearing holder 41 is rotatably supported by the upper bearing holder 42 and the lower bearing holder 43.

The resolver 5 preferably includes a resolver stator portion 51 of a substantially annular shape concentric about the central axis J1, and a resolver rotor portion 52 arranged affixed to the shaft 31 at an inner side of the resolver stator portion 51 above the yoke 32. The resolver rotor portion 52 preferably includes a rotor core 521 formed by laminating a plurality of magnetic steel plates of substantially annular shape.

Resolver

Figure 4:
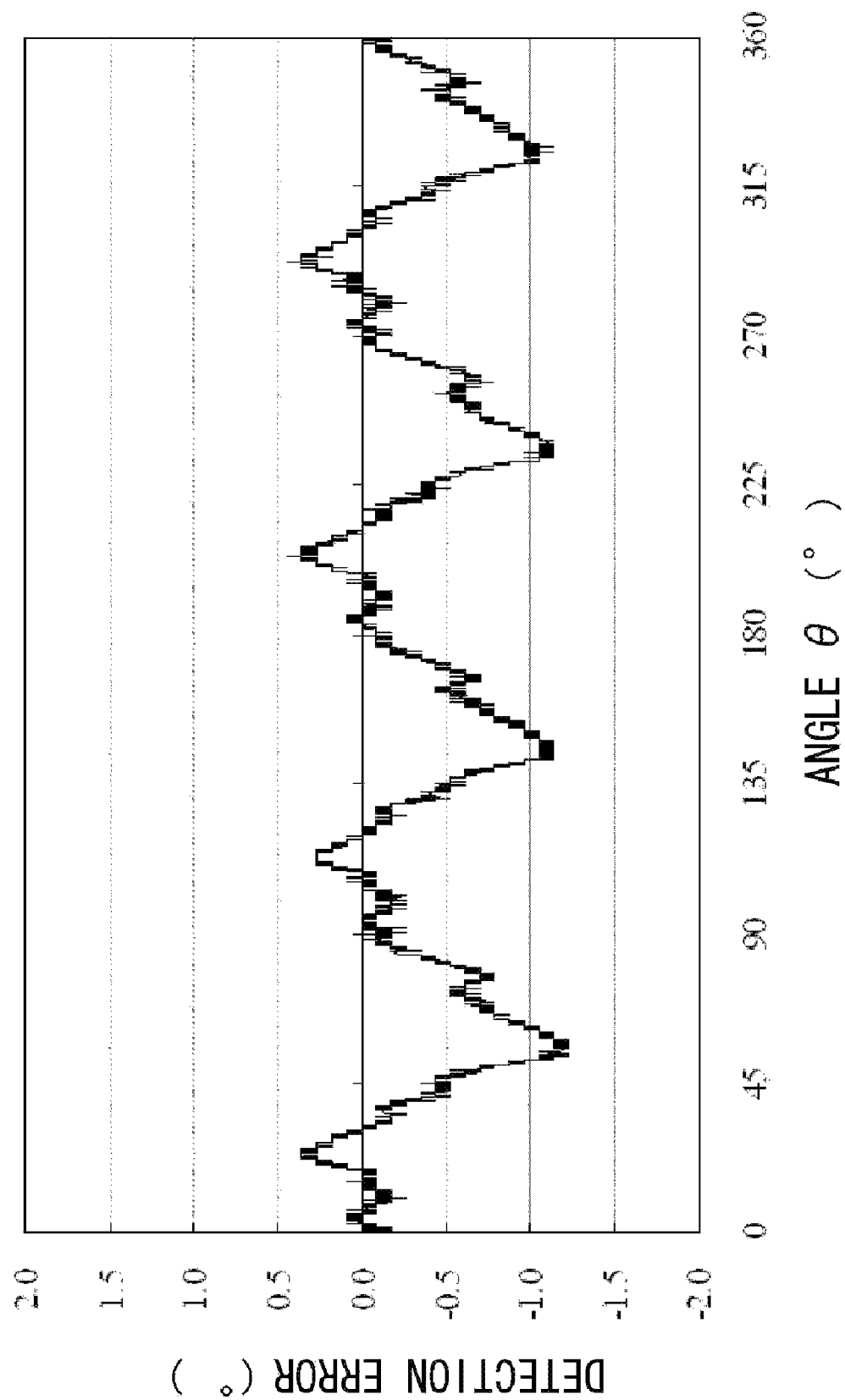
FIG. 4 is a graph indicating a correlation between an angle which is defined by a relative positioning of a rotor portion with respect to a stator portion of the motor according to a preferred embodiment of the present invention and a detection error.
Figure 5:
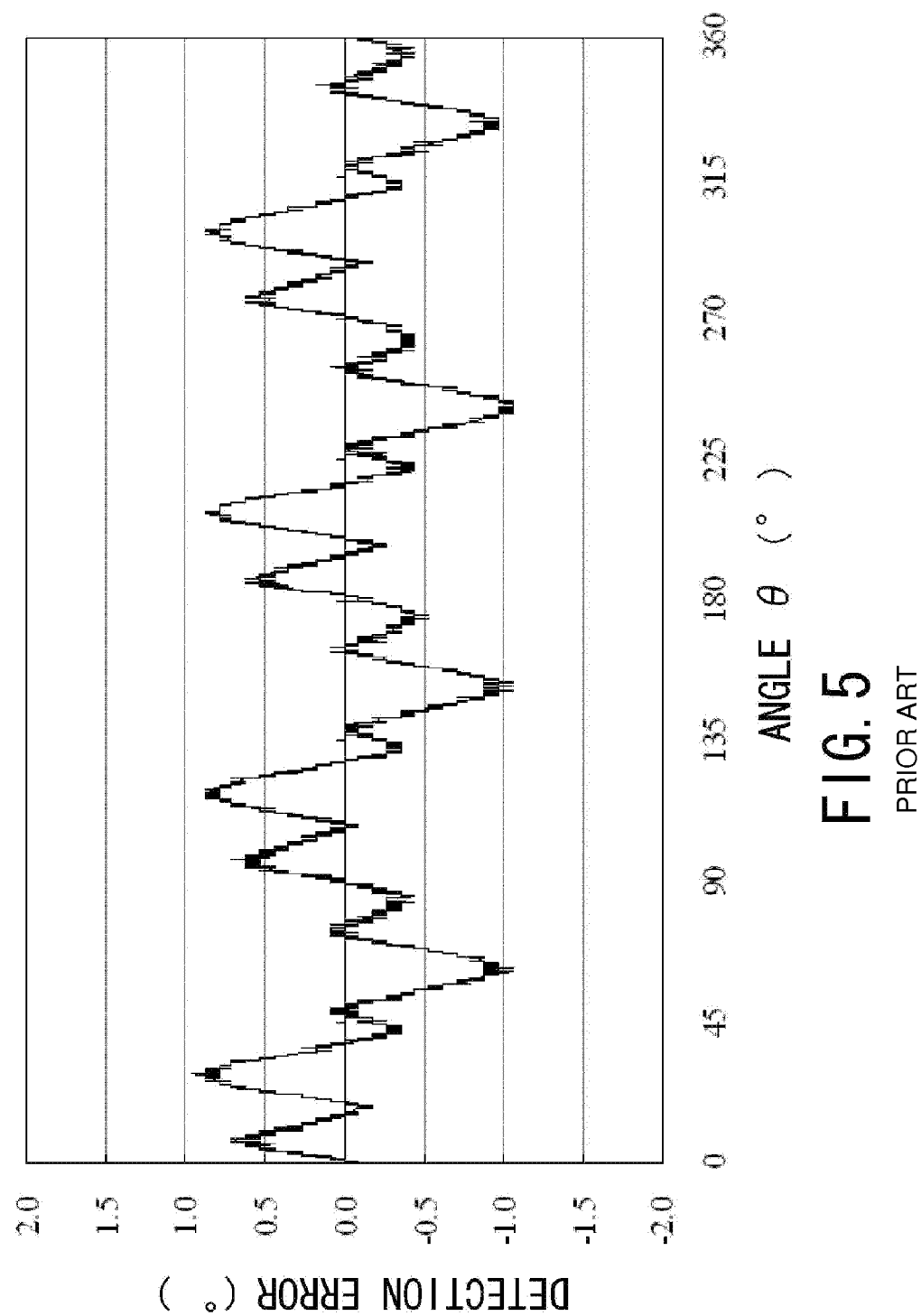
FIG. 5 is a graph indicating a correlation between an angle which is defined by a relative positioning of a rotor portion with respect to a stator portion of a conventional motor and a detection error.

Hereinafter, the resolver 5 according to the present preferred embodiment of the present invention will be described with reference to FIGS. 2 to 5. FIG. 4 is a graph indicating a correlation between an angle which is defined by a relative positioning of the motor rotor portion 3 with respect to the motor stator portion 2 of the motor 1 according to the present preferred embodiment of the present invention and a detection error. FIG. 5 is a graph indicating a correlation between an angle which is defined by a relative positioning of a motor rotor portion with respect to a motor stator portion of a conventional motor and a detection error. Note that FIG. 3 omits, for clarity of depiction, the coil 513 and the insulator 512 (see FIG. 2). Also note that a cross section of the shaft 31 is depicted without parallel diagonal lines. Also note that in FIGS. 4 and 5 each, the angle defined by the relative positioning of the motor rotor portion 3 with respect to the motor stator portion 2 is indicated along the horizontal axis while the detection error of the resolver 5 is indicated along the vertical axis.

As shown in FIG. 2, the resolver stator portion 51 preferably includes a stator core 511 which is formed by laminating a plurality of thin magnetic steel plates and is attached at the inner circumferential surface of the bearing holder 41. The stator core 511 preferably includes a core back 5111 of a substantially annular shape, a plurality (for example, 16 in the present preferred embodiment (i.e., 16 magnetic poles)) of teeth 5112 each extending from the core back 5111 toward the central axis J1. The resolver stator portion 51 preferably includes an insulator 512 formed by coating a surface of the stator core 511, and a plurality of coils 513 each formed by winding a conductive wire around each tooth 5112 via the insulator 512. Note that the coils 513 include one phase excitation coil and two phase output coil.

Figure 3:
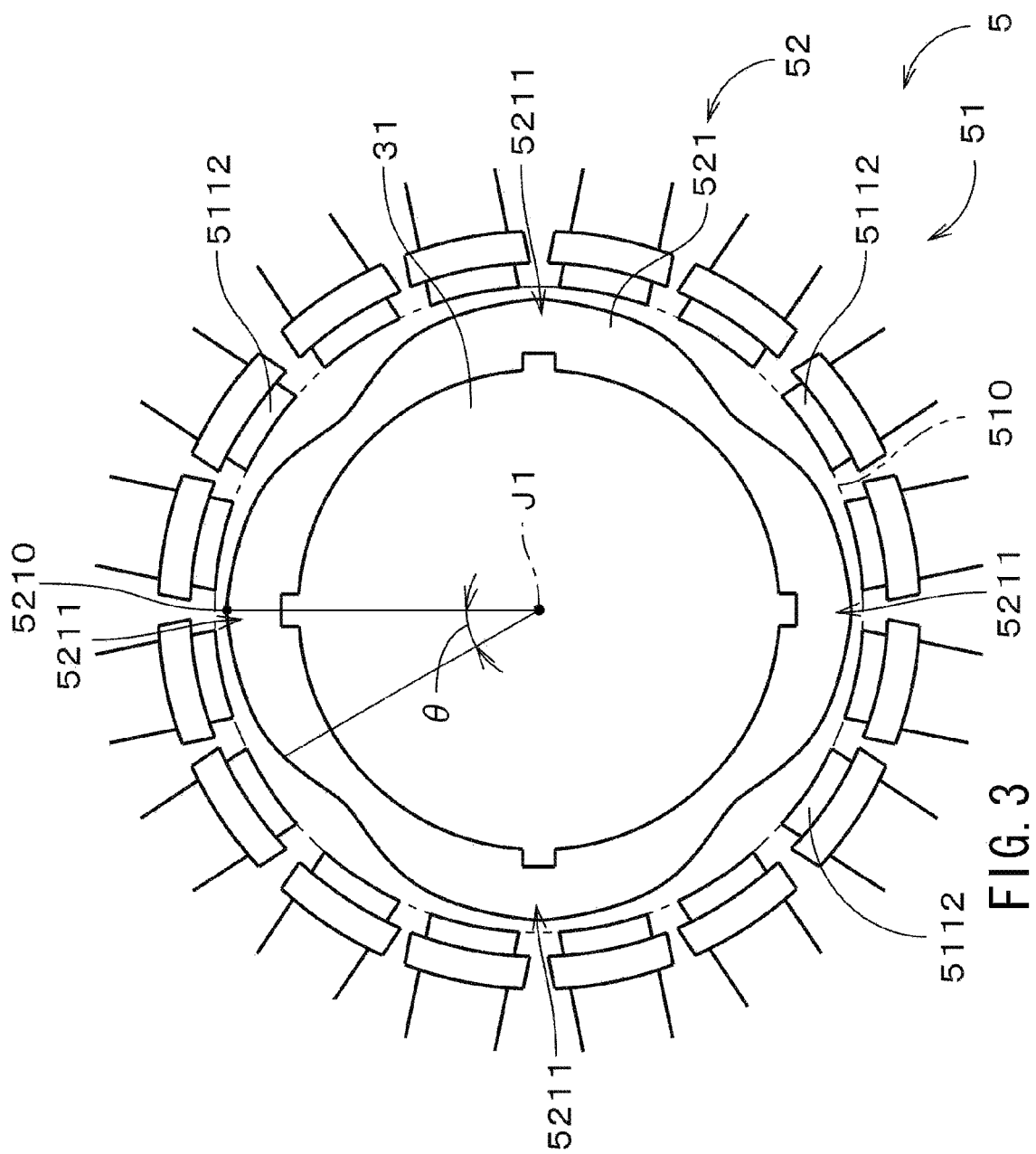
FIG. 3 is a plan view of a shaft and a portion of a resolver according to a preferred embodiment of the present invention.

As shown in FIG. 3, the rotor core 521 preferably includes, as viewed from above, a curved line forming an outer circumferential surface. The rotor core 521 is arranged at an inner circumferential surface (see dotted and dashed line 510) of the resolver stator portion 51 via a gap therebetween. According to the present preferred embodiment of the present invention, a diameter of the inner circumferential surface of the resolver stator portion 51 preferably is approximately 20 mm. Also, the rotor core 521 is formed by laminating a plurality of thin steel magnetic plates.

Also, the stator core 511 and the rotor core 521 are preferably formed by a single magnetic steel plate. By virtue of such configuration, the magnetic steel plates will be used efficiently allowing the resolver 5 to be sold at a lower price.

According to the motor 1 of the present preferred embodiment of the present invention, the shaft 31 rotates while centered about the central axis J1 due to the rotary force generated between the armature 22 and the field magnet 33. By virtue of such configuration, the rotor core 521 shown in FIG. 3 rotates centered about the central axis J1 along with the motor rotor portion 3. As described above, the resolver stator portion 51 is secured by the motor stator portion 2 (see FIG. 2) via the bearing holder 41 and the bracket 24. Therefore, in the resolver 5 according to the present preferred embodiment of the present invention, the rotor core 521 of the resolver rotor portion 52 is rotatably supported with respect to the resolver stator portion 51 via the shaft 31 and the bearing mechanism 4.

As shown in FIG. 3, the rotor core 521 preferably includes 4 protrusions 5211 each loosely protruding outwardly away from the central axis J1. An axial double angle n (namely, a frequency of an angle outputted by the rotor core 521 during a course of a revolution in the resolver 5; an angle denoted by a positive number) equals a number of protrusions 5211, and therefore, preferably is 4. According to the resolver 5 of the present preferred embodiment of the present invention, a gap g between the rotor core 521 and the resolver stator portion 51 is smallest ($g_{min}$) at an outer circumferential end of each protrusion 5211, and greatest ($g_{max}$) at a portion between two adjacent protrusions. According to the present preferred embodiment of the present invention, the $g_{min}$ is approximately 0.35 mm and $g_{max}$ is approximately 1.45 mm.

As shown in FIG. 3, when a point of reference 5210 is set at a central point of the outer circumferential end of one of the protrusions 5211 and an angle θ is defined between the point of reference 5210 and a predetermined point on the outer circumferential end of the rotor core 521, portions of the gap corresponding to θ=0°, 90°, 180°, 270° will generate gmin and portions of the gap corresponding to θ=45°, 135°, 225°, 315° will generate gmin.

According to the resolver of the variable reluctance type a gap permeance between the resolver stator portion and the rotor core is, when the rotor core is rotated, approximated to a sine wave pattern, and therefore, a detection error potentially caused by the harmonic components will be minimized. The gap permeance will be approximated to the sine wave pattern when the gap g is as defined when the values for $g_{max}$, $g_{min}$, angle θ, axial double angle n, and the coefficient K are set as denoted in a following equation:

$$g = \frac{1}{\frac{1}{2}\left(\frac{1}{g_{min}} + \frac{1}{g_{max}}\right) + \frac{1}{2}\left(\frac{1}{g_{min}} - \frac{1}{g_{max}}\right)\cdot\cos(n\theta)} + K(1 - \cos(2n\theta)).$$

In particular, a range of most appropriate coefficient K will be determined after a series of simulations applying various values for the coefficient K to determine a smallest value for the detection error. Further, experiments may be performed to determine the most appropriate value for the coefficient K. According to the present preferred embodiment of the present invention, the coefficient K is preferably between approximately −0.024 and 0.000.

As shown in FIGS. 4 and 5, according to the present preferred embodiment of the present invention, in order to determine a configuration of the rotor core 521, gap g is calculated by applying the values for $g_{max}$, $g_{min}$, an angle θ defined between the point of reference 5210 and the predetermined point, axial double angle n, and the coefficient K. Consequently, occurrence of detection error (that is, measurement error of an order of component according to a number of slots of the stator core 511) concerning the sixteenth order component will be reduced. As described above, according to the resolver 5 of the present preferred embodiment of the present invention, detection accuracy will be improved by reducing detection error potentially caused by the harmonic components.

The resolver 5 according to the present preferred embodiment of the present invention is suitable for detecting angle of rotation of the motor rotor portion of a motor requiring high accuracy. Further, since the resolver 5 according to the present preferred embodiment of the present invention is, compared with an optical encoder or a magnetic encoder, high in environmental resistance, a motor having the resolver 5 will be suitable for an electric power steering apparatus for use in an automobile or the like.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

For example, the axial double angle n (i.e., a number of protrusions 5211) of the resolver 5 may have an integer number other than 4. When the value for the axial double angle n is other than 4, the detection error potentially caused by the harmonic components will be minimized. That is, the resolver 5 according to preferred embodiments of the present invention can increase the accuracy of detection regardless of the value for the axial double angle n. Also, the resolver 5 according to preferred embodiments of the present invention may include at the resolver stator portion 51 two phases of excitation coils and one phase of output coil.

The motor 1 according to preferred embodiments of the present invention may be used for, besides the electrically powered power steering apparatus, a drive source for an electric bicycle, a hybrid car, or a power generator for the hybrid car, or the like. The resolver 5 according to preferred embodiments of the present invention may be used for an angle detection apparatus for detecting a rotational angle of a rotary apparatus other than the motor 1.

What is claimed is:

1. A variable reluctance resolver, comprising:
   a resolver stator portion having a substantially annular shape centered about a central axis and including an excitation coil and an output coil; and
   a rotor portion having a rotor core arranged concentrically with respect to the central axis, rotatably supported with respect to the resolver stator portion, and arranged radially inward of the resolver stator portion via a gap g therebetween, wherein
   a size of the gap g is calculated by a following equation:

$$g = \frac{1}{\frac{1}{2}\left(\frac{1}{g_{min}} + \frac{1}{g_{max}}\right) + \frac{1}{2}\left(\frac{1}{g_{min}} - \frac{1}{g_{max}}\right)\cdot\cos(n\theta)} + K(1 - \cos(2n\theta))$$

in which $g_{max}$ is a minimum value for the gap g, $g_{min}$ is a maximum value for the gap g, angle θ is defined between a point of reference and a predetermined point set at an outer circumferential end of the core, n is an axial double angle which is a positive integer, and K is a coefficient.

2. The resolver according to claim 1, wherein the coefficient K is greater than about −0.024 and smaller than 0.000.

3. The resolver according to claim 1, wherein the resolver stator portion includes a stator core having a laminated member including a plurality of thin magnetic steel plates, and the rotor core includes a laminated member having a plurality of thin magnetic steel plates.

4. The resolver according to claim 3, wherein the stator core and the rotor core are defined by the same thin magnetic steel plates.

5. The resolver according to claim 1, wherein the resolver stator portion includes an excitation coil and a plurality of output coils.

6. The resolver according to claim 1, wherein the resolver stator portion includes 16 magnetic poles, and an axial double angle is 4.

7. The resolver according to claim 1, wherein an outer circumferential surface of the rotor portion is solely comprised of a curved surface.

8. An electrically powered motor comprising:
the resolver according to claim 1;
a motor stator portion having an armature;
a motor rotor portion having a field magnet generating between the armature a torque centered about the central axis, and having attached thereon a portion of a rotor portion of the resolver; and
a bearing mechanism rotatably supporting the motor rotor portion centered about the central axis with respect to the motor stator portion.

9. An electrically powered power steering apparatus used for assisting in steering a steering wheel, the power steering apparatus comprising:
the motor according to claim 8;
a torque sensor detecting a rotary force applied to the steering wheel; and
a control unit controlling the steering apparatus based on an output from the torque sensor the motor.

* * * * *